United States Patent
Perusse, Jr.

(10) Patent No.: US 8,726,002 B2
(45) Date of Patent: May 13, 2014

(54) EMBEDDED MANAGED SYSTEM SERVICES REPOSITORY

(75) Inventor: Charles T. Perusse, Jr., Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 830 days.

(21) Appl. No.: 12/698,297

(22) Filed: Feb. 2, 2010

(65) Prior Publication Data

US 2011/0191571 A1    Aug. 4, 2011

(51) Int. Cl.
G06F 9/00    (2006.01)
G06F 9/24    (2006.01)
G06F 15/177    (2006.01)
G06F 9/44    (2006.01)
G06F 9/445    (2006.01)

(52) U.S. Cl.
USPC ............... 713/100; 713/1; 713/2; 717/168; 717/174

(58) Field of Classification Search
None
See application file for complete search history.

(56) References Cited

U.S. PATENT DOCUMENTS

| | | | |
|---|---|---|---|
| 5,339,432 A * | 8/1994 | Crick | 713/1 |
| 6,754,817 B2 * | 6/2004 | Khatri et al. | 713/1 |
| 7,080,244 B2 * | 7/2006 | Natu et al. | 713/1 |
| 7,237,102 B2 * | 6/2007 | Rothman | 713/1 |
| 7,681,026 B2 * | 3/2010 | Martinez | 713/1 |
| 2004/0268107 A1* | 12/2004 | Zimmer et al. | 713/1 |
| 2010/0131746 A1* | 5/2010 | Cool et al. | 713/2 |
| 2011/0016298 A1* | 1/2011 | McCollom | 713/1 |

OTHER PUBLICATIONS

Dell, Dell Enterprise Technology Center, TechCenter Wiki, Lifecycle Controller, Dec. 16, 2009.
J. Hass et al., DELL Lifecycle Controller Overview, Remote Services Capabilities, A Dell Technical White Paper, Dec. 2009.
J. Hass et al., DELL Lifecycle Controller Remote Services Overview, A Dell Technical White Paper, Aug. 2009.

* cited by examiner

*Primary Examiner* — Ji H Bae
(74) *Attorney, Agent, or Firm* — Terrile, Cannatti, Chambers & Holland, LLP; Stephen A. Terrile

(57) ABSTRACT

An embedded management system that allows an administrator to manage the systems hardware without having to install and setup any management software. In certain embodiments, the embedded management ecosystem includes a unified extensible firmware interface (UEFI), internal persistent storage and a service processor to provide a single interface that allows the administrator to consistently manage system hardware independent of any operating system without installing an operating system or specific agents.

12 Claims, 3 Drawing Sheets

EMBEDDED MANAGED SYSTEM SERVICES REPOSITORY

BACKGROUND OF THE INVENTION

1. Field of the Invention

The present invention relates to information handling systems and more particularly to an embedded managed system services repository.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With the proliferation of information handling systems, especially within large scale information handling system installations, an important issue relates to the service and support of the large scale information handling system installations (i.e., installations in which more than a few information handling systems are supported by a single entity. The entity that services and supports such an installation is often referred to as a managed service provider. Managed services, or life-cycle services, generally include deployment services and asset services. More specifically, managed services include some or all of asset deployment and installation services, asset management services (including, e.g., both asset tracking and asset moving services), asset maintenance services and asset retirement services.

A managed service provider provides a customer with an ability to procure, deploy, support and manage information handling system technologies across the life cycle of the information handling systems. Issues relating to managed services include information management and asset utilization while providing quality service delivery and a favorable customer experience.

Known managed service providers can be generally divided into two categories: internally staffed managed service providers and out-sourced managed service providers. Internally staffed managed service providers generally have a number of employees with the specific job description of providing service to a particular client. Out-sourced managed service providers generally use third party service providers to provide service to a particular client of the service provider.

One issue of managed services relates to systems management. Often installing and configuring software used to perform systems management, especially on server type information handling systems, is a complex and complicated process just to be able to manage hardware within the information handling system. For example, referring to FIG. 1, labeled Prior Art, a block diagram of a system for performing the process of installing and configuring the software used to perform system management includes installing an operating system (OS), installing and configuring all corresponding drivers (e.g., the network stack), and installing and configuring the systems management software (e.g., agents, Dynamic link library files (DLLs), web server software, and a graphical user interface (GUI) framework). Each of these components can include their own set of challenges to install and configured. If the components are not fully installed and configured then it is likely possible that the system will not be fully managed or deployable.

Accordingly, it would be desirable to provide a means of simplifying the process of installing and configuring the software used to perform systems management.

SUMMARY OF THE INVENTION

In accordance with the present invention, an embedded management system is provided that allows an administrator to manage the systems hardware without having to install and setup any management software. In certain embodiments, the embedded management ecosystem includes a unified extensible firmware interface (UEFI), internal persistent storage and a service processor to provide a single interface that allows the administrator to consistently manage system hardware independent of any operating system without installing an operating system or specific agents.

More specifically, in one embodiment, the invention relates to method for managing an information handling system comprising providing the information handling system with an embedded management system, the embedded management system allowing an administrator to manage the information handling system without having to install and setup any management software.

In another embodiment, the invention relates to an information handling system for managing the entitlement of digital assets. The information handling system includes a processor, a storage medium, the storage medium storing an embedded management system. The embedded management system comprising instructions executable by the processor for allowing an administrator to manage the information handling system without having to install and setup any management software.

In another embodiment, the invention relates to a computer-usable medium storing an embedded management system, the embedded management system embodying computer program code, the computer program code comprising processor executable instructions configured for allowing an administrator to manage the information handling system without having to install and setup any management software.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
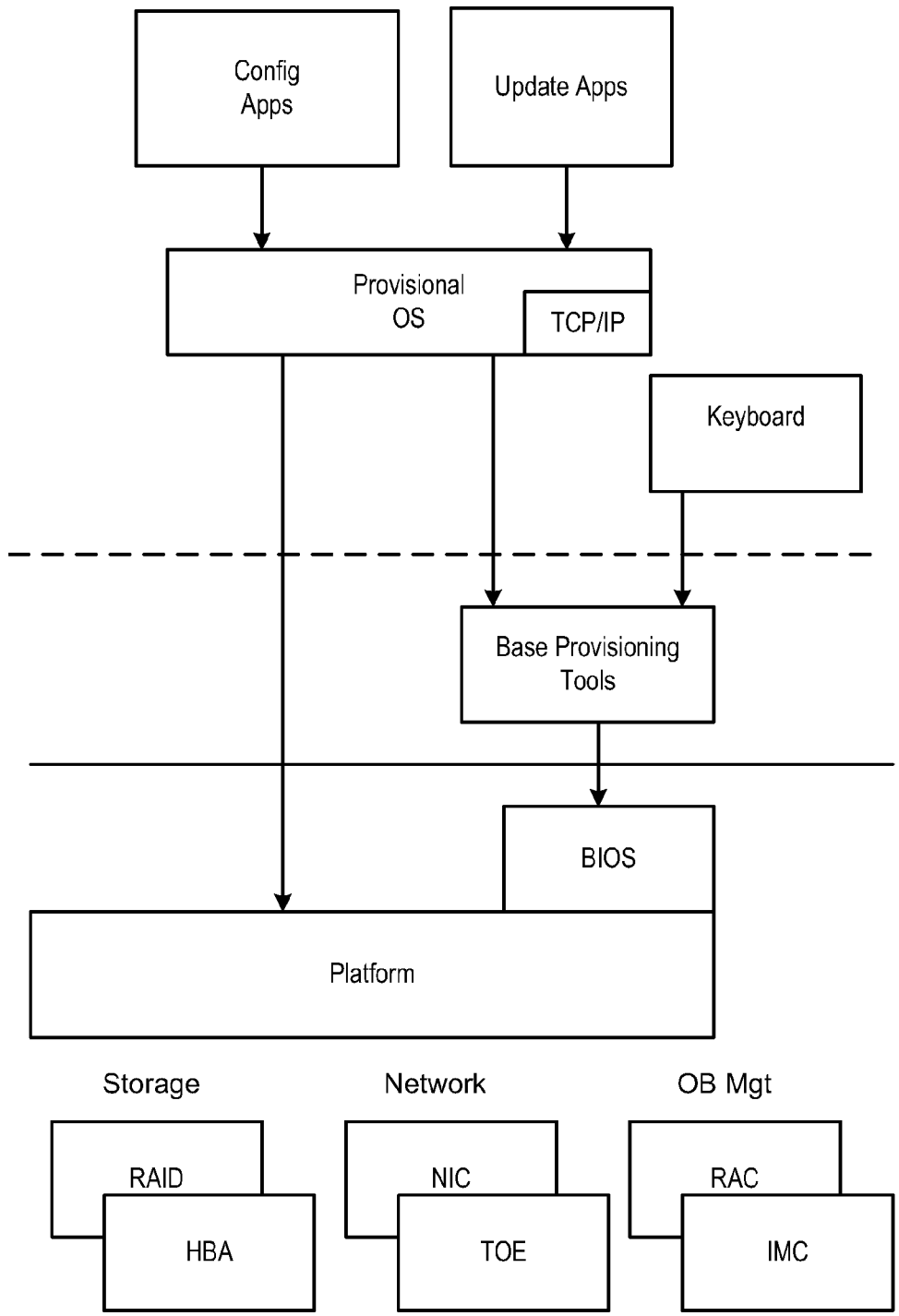
FIG. 1, labeled Prior Art, shows a block diagram of a system for performing a process of installing and configuring the software used to perform system management.
Figure 2:
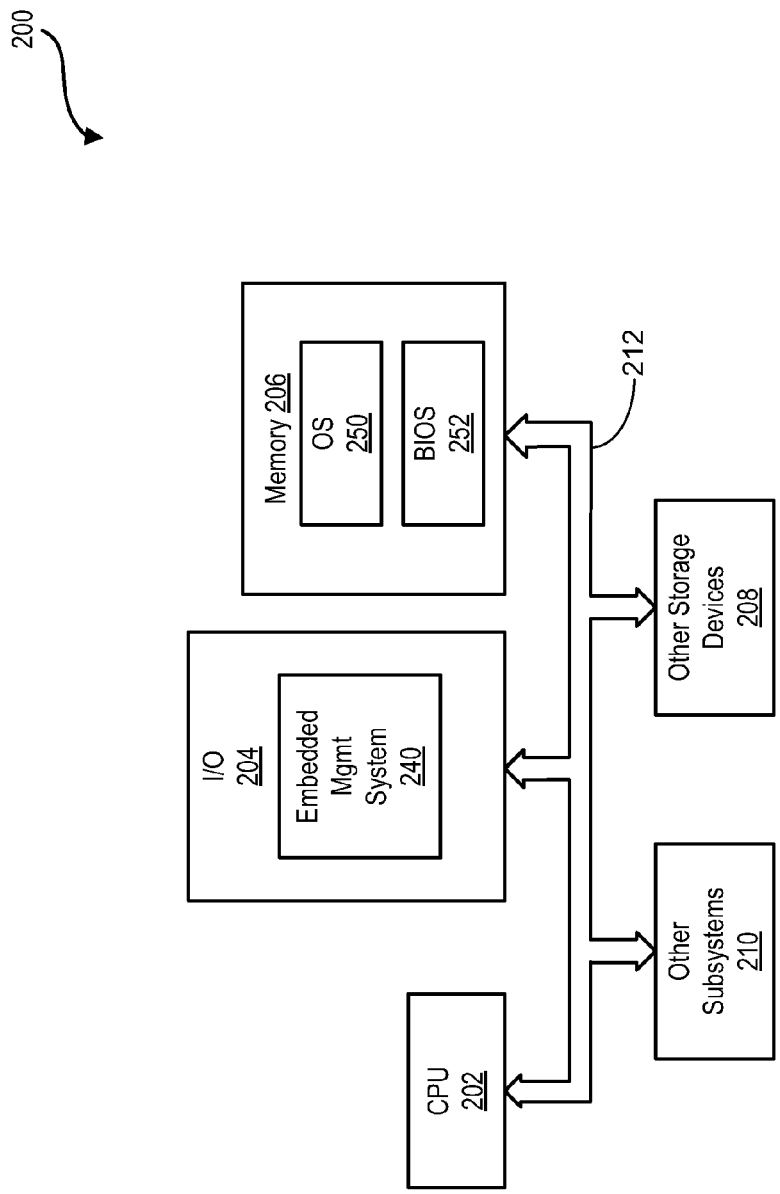
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers (each of which may be coupled remotely to the information handling system 200), a memory 206 including volatile memory such as random access memory (RAM) and non-volatile memory such as a hard disk and drive, and other storage devices 208, such as an optical disk and drive and other memory devices, and various other subsystems 210, all interconnected via one or more buses 212.

The I/O devices 204 further include an embedded management system 240 which is stored on computer readable memory and executed by a processor. The information handling system 200 further includes an operating system 250 as well as BIOS 252 which are stored on the memory 206 and executed by the processor 202.

The embedded management system 240 allows an administrator to manage the information handling system 200 without having to install and setup any management software. In certain embodiments, the embedded management system includes a unified extensible firmware interface (UEFI), internal persistent storage and a service processor to provide a single interface that allows the administrator to consistently manage the information handling system independent of any operating system without installing an operating system or specific agents.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
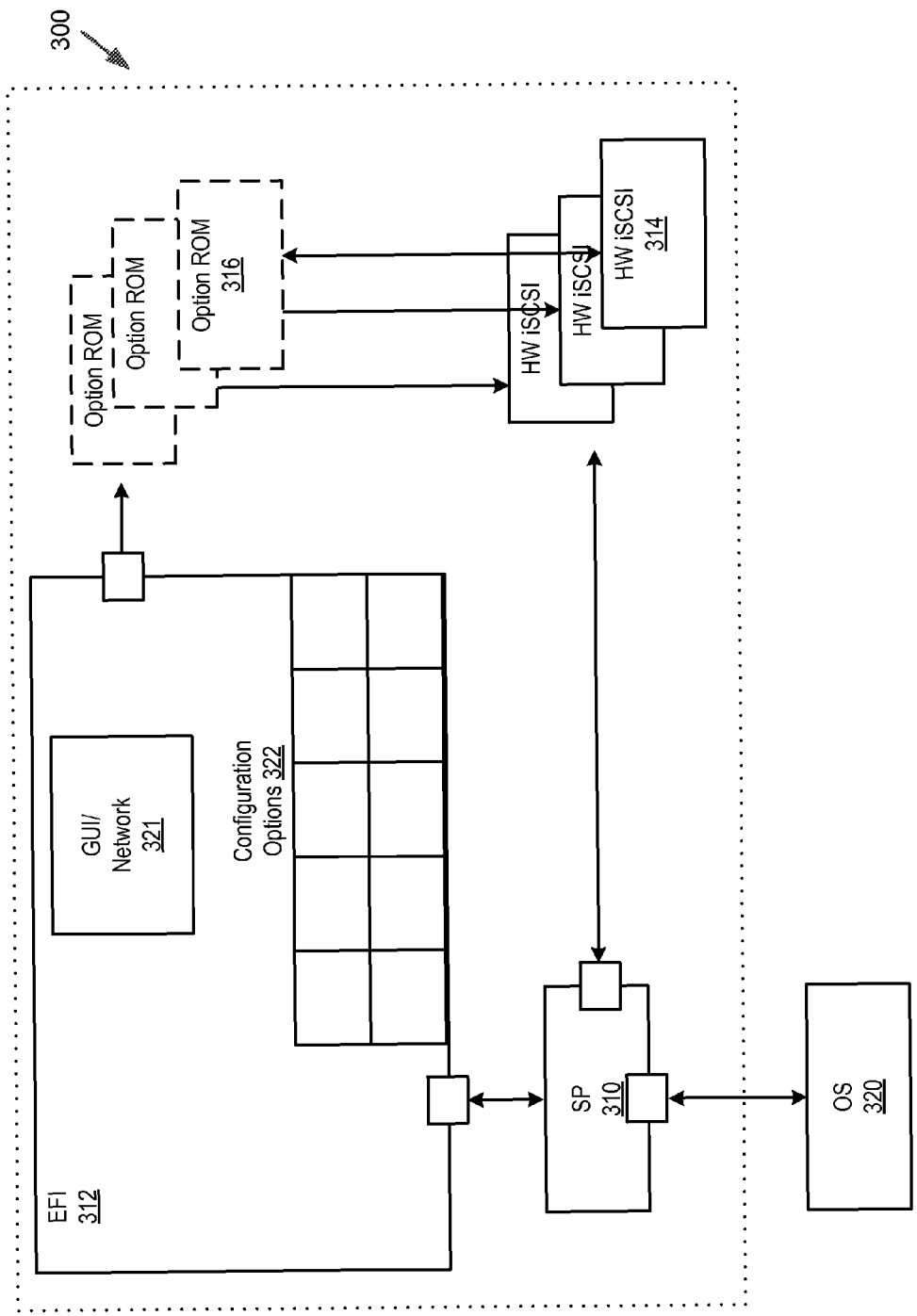
FIG. 3 shows a block diagram of an embedded management system.

Referring to FIG. 3, a block diagram of an embedded management system 300 that allows an administrator to manage the systems hardware without having to install and setup any management software. In certain embodiments, the embedded management ecosystem includes a unified extensible firmware interface (UEFI), internal persistent storage and a service processor to provide a single interface that allows the administrator to consistently manage system hardware independent of any operating system without installing an operating system or specific agents. The embedded system may be referred to as a managed system services repository (MASER).

More specifically, the embedded management system 300 includes a service processor 310, an extensible firmware interface (EFI) 312, a plurality of hardware storage modules 314 (e.g., Internet Small Computer System Interface (iSCSI) modules, network interface cards (NICs), etc.) and at least one persistent storage module 316 (e.g., an option read only memory such as an iSCSI module) that contains drivers applications and logic for the embedded management systems. An administrator can gain remote access to the embedded management system 300 via a service type operating system 320 executing on information handling system 200. In various embodiments, the service type operating system may include a Windows Reinstallation environment (WinPE) type operating system, an execute in place (E. Linux) type operating system, a Microsoft Windows type operating system, a SUSE Linux (SuSE) type operating system or a RedHat Linux type operating system.

The EFI 312 also includes a graphical user interface and network module 320 which is stored on computer readable memory and executes on the service processor 310. The EFI 312 also includes non-volatile memory for storing a plurality of configuration options 322.

The embedded management system 300 provides an information handling system 100 with a plurality of system management features that facilitate managing of the information handling system. For example, the embedded management system 300 provides an operating system independent system which enables operating system deployment without the need of a hardware vendor's media or drivers (all drivers are embedded within the internal persistent storage of the embedded system). The embedded management system provides a lifecycle log. The lifecycle log is a log that has factory settings along with any change to the hardware or firmware of the information handling system. This lifecycle log provides audit tracking for support groups as well as an instant inventory of the system.

The embedded management system 300 also provides for staging of BIOS and firmware updates and configuration. This staging can apply updates or configuration changes in a single reboot, separate from the time that the updates were staged.

The embedded management system 300 also includes a rollback feature that allows a system administrator to seamlessly roll back to a previous version of the BIOS and/or firmware components. The rollback feature further includes a BIOS Recover feature that if the system loses power during a BIOS flash, the embedded management system 300 recognizes the failed state and uses the firmware staged on the persistent storage within the embedded management system 300 to recover (i.e., to reflash the BIOS).

The embedded management system 300 provides a part replacement feature that allows a customer to change a hardware component and when the system is powered back on the firmware and configuration settings (including the media access control (MAC) address and World Wide (WW) names) are reset to hardware allowing the information handling system to function properly in the customer environment.

The embedded management system 300 provides a rip and replace feature that allows a customer to take a failing system's personality (e.g., the BIOS and firmware and configuration settings (including MAC address and WW Names) and replace them on a properly functioning system.

The embedded management system 300 provides a cloning feature that allows an administrator to backup a properly configured system's BIOS/firmware and configuration setting and to push these elements to many systems.

The embedded management system 300 provides an embedded diagnostics feature which allows a user to diagnose a hardware problem of the information handling system. Because this embedded diagnostics feature is included within the embedded management system, the diagnostic function cannot be lost or accidently removed then a system is repartition or if a redundant array of inexpensive disks (RAID) is recreated.

The embedded management system 300 provides a plurality of benefits to the customer of the information handling system as well as to the information handling system supplier and managed services provider. For example, with respect to the customer, the embedded a management system 300 provides an extremely manageable ecosystem. All information handling systems within the customer's ecosystem are consistently manageable, all system components within each of the information handling systems are consistently manageable and vendor/component specific required training is reduced. The embedded management system 300 also provides a single management interface for the customer's ecosystem. The embedded management system 300 is operating system agnostic. I.e., the embedded management system 300 works regardless of the operating system executing on the information handling system at any given time, the embedded management system 300 is manageable even if the operating system is crashed or is not present and the embedded management system 300 allows consistent management of the information handling system in a pre or post operating system configuration. The embedded management system 300 is operating system agentless (i.e., the embedded management system 300 does not require operating system image changes or added software.

With respect to the information handling system supplier and managed services provider, the embedded management system 300 provides increase sales opportunities because the embedded management system 300 allows managed services support for non manufacturer supported operating system environments. The embedded management system 300 reduces software development efforts because the embedded management system 300 removes the need for multiple code stacks for multiple operating systems that perform the same or similar functions, removes the need to have to change code due to a service pack, hot fix or new version of an operating system, deprecates legacy tools and interfaces to allow support of a product with a single system, and only requires testing of a single interface which is independent of the operating system. The embedded management system 300 also enables a dynamic datacenter strategy which provides support for intelligent resource management and provides a foundation for performance monitoring which is independent of the operating system. The embedded management system 300 provides for increased support and services capability because the embedded management system 300 allows an administrator to debug problems independent of the operating system and a managed services provider to offer remote management services independent of the operating system.

The embedded management system 300 allows a system administrator to administer the system without the need to install an operating system or pre operating system, to install and configure corresponding drivers (e.g., a network stack), to install and configure management software (e.g., agents, dynamic link library files (DLLs), a web server application, a graphical user interface (GUI) framework).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example the embedded management system allows managing the information handling system with a plurality of management functions including at least one of providing a staged firmware update, the staged firmware being applied in a single reboot of the information handling system, providing a staged firmware update to allow recovery of the information handling system, providing a staged firmware update to allow rollback of any previous firmware update; facilitate part replacement within the information handling system, facilitate a rip and replace operation (i.e., an operation in which all traces of a previous version of a software application are removed and seamlessly replaced with a new version of the software); facilitate cloning of software of the information handling system; and, perform embedded diagnostics on the information handling system.

Consequently, the invention is intended to be limited only by the spirit and scope of the appended claims, giving full cognizance to equivalents in all respects.

What is claimed is:

1. A method for managing an information handling system comprising:
   providing the information handling system with an embedded management system; and,
   managing, via the embedded management system, the information handling system without having to install and setup any management software; and wherein
   the embedded management system comprises a unified extensible firmware interface (UEFI), internal persistent storage, a service processor and a service operating system to provide a single interface that allows an administrator to consistently manage system hardware independent of an operating system executing on the information handling system; and wherein the service operating system includes at least one of a Windows reinstallation environment operating system, an execute in place operating system and a SUSE Linux operating system.

2. The method of claim 1 wherein:
the embedded management system provides an operating system independent system which enables operating system deployment without a need of any media and drivers from specific hardware vendor.

3. The method of claim 1 wherein:
all drivers used by the information handling system are embedded within internal persistent storage of the embedded management system.

4. The method of claim 1 wherein:
the embedded management system further comprises a lifecycle log, the lifecycle log comprising a log that has factory settings along with any change to hardware or firmware of the information handling system, the lifecycle log enabling audit tracking for system management as well as an instant inventory of the information handling system.

5. An information handling system for managing the entitlement of digital assets, comprising:
a processor,
a non-transitory storage medium, the storage medium storing an embedded management system, the embedded management system comprising instructions executable by the processor for:
managing the information handling system without having to install and setup any management software and wherein
the embedded management system comprises a unified extensible firmware interface (UEFI) and a service operating system to provide a single interface that allows an administrator to consistently manage system hardware independent of any operating system executing on the information handling system; and
the service operating system includes at least one of a Windows reinstallation environment operating system, an execute in place operating system and a SUSE Linux operating system.

6. The information handling system of claim 5 wherein:
the embedded management system provides an operating system independent system which enables operating system deployment without a need of any media and drivers from specific hardware vendor.

7. The information handling system of claim 5 wherein:
all drivers used by the information handling system are embedded within internal persistent storage.

8. The information handling system of claim 5 wherein:
the embedded management system further comprises a lifecycle log, the lifecycle log comprising a log that has factory settings along with any change to hardware or firmware of the information handling system, the lifecycle log enabling audit tracking for system management as well as an instant inventory of the information handling system.

9. A non-transitory computer-usable medium storing an embedded management system, the embedded management system embodying computer program code, the computer program code comprising processor executable instructions configured for:
managing the information handling system without having to install and setup any management software; and wherein
the embedded management system comprises a unified extensible firmware interface (UEFI) and a service operating system stored on the computer-usable medium to provide a single interface that allows an administrator to consistently manage system hardware independent of any operating system executing on the information handling system; and
the service operating system includes at least one of a Windows reinstallation environment operating system, an execute in place operating system and a SUSE Linux operating system.

10. The computer-usable medium of claim 9 wherein:
the embedded management system provides an operating system independent system which enables operating system deployment without a need of any media and drivers from specific hardware vendor.

11. The computer-usable medium of claim 9 wherein:
all drivers used by the information handling system are embedded within internal persistent storage.

12. The computer-usable medium of claim 9 wherein:
the embedded management system further comprises a lifecycle log, the lifecycle log comprising a log that has factory settings along with any change to hardware or firmware of the information handling system, the lifecycle log enabling audit tracking for system management as well as an instant inventory of the information handling system.

* * * * *